United States Patent [19]

Kuromitu

[11] Patent Number: 4,660,381
[45] Date of Patent: Apr. 28, 1987

[54] HYDRAULIC BOOSTER WITH ELECTRICALLY DRIVEN PLUNGER PUMP

[75] Inventor: Hiromu Kuromitu, Chiryu, Japan

[73] Assignee: Aisin Seiki Kabushiki Kaisha, Japan

[21] Appl. No.: 716,995

[22] Filed: Mar. 28, 1985

[30] Foreign Application Priority Data

Mar. 30, 1984 [JP] Japan ................... 59-62683

[51] Int. Cl.[4] ........................ B60T 13/12; F16D 31/02; F15B 7/00; F04B 49/00
[52] U.S. Cl. ........................ 60/548; 60/553; 60/581; 60/582; 60/413; 60/431; 60/433; 417/38; 417/44
[58] Field of Search ............. 60/545, 547.1, 548, 60/552, 553, 577, 581, 582, 413, 431, 433; 91/6, 369 R; 417/38, 44

[56] References Cited

U.S. PATENT DOCUMENTS

| | | | |
|---|---|---|---|
| 2,812,639 | 11/1957 | Whitten | 60/547.1 X |
| 3,048,979 | 8/1962 | Grigsby et al. | 60/545 |
| 3,050,944 | 8/1962 | Schwartz et al. | 60/548 |
| 3,898,808 | 8/1975 | Ewald et al. | 60/413 X |
| 4,081,621 | 3/1978 | Hartley | 417/38 X |
| 4,154,326 | 5/1979 | Wolf | 60/548 X |
| 4,398,389 | 8/1983 | Horvath | 60/545 |
| 4,422,293 | 12/1983 | Ewald | 60/547.1 |
| 4,475,336 | 10/1984 | Runkle | 60/545 |

FOREIGN PATENT DOCUMENTS 3215954 11/1983 Fed. Rep. of Germany ..... 60/547.1

Primary Examiner—Robert E. Garrett
Assistant Examiner—George Kapsalas
Attorney, Agent, or Firm—Finnegan, Henderson, Farabow, Garrett & Dunner

[57] ABSTRACT

A hydraulic booster including an input piston adapted to be actuated by a manually operated member such as a brake pedal. The input piston is axially slidable in a power piston which is in turn axially slidable in a booster casing. The power piston divides the inside cavity of the casing into a power chamber and a reservoir chamber. An electrically operated plunger pump is provided and has an outlet port connected with the power chamber and an inlet port. Between the input piston and the power piston, there are defined a first valve and a second valve. The first valve functions to open the power chamber to the reservoir chamber when the pedal is released but to disconnect the power chamber from the reservoir chamber when the input piston is depressed by a first predetermined distance. The second valve functions to normally disconnect the inlet port of the plunger pump from the reservoir chamber but opens the inlet port to the reservoir chamber when the input piston is depressed by a second predetermined distance which is greater than the first predetermined distance. The arrangement is effective to decrease the load on the pump in operation of the booster.

8 Claims, 4 Drawing Figures

4,660,381

HYDRAULIC BOOSTER WITH ELECTRICALLY DRIVEN PLUNGER PUMP

BACKGROUND OF THE INVENTION

1. Field of the Invention

The present invention relates to a hydraulic booster adapted to be used in vehicle brakes and the like. More particularly, the present invention pertains to hydraulic brake boosters having electrically operated booster pumps.

2. Description of Prior Art

A hydraulic booster having an electrically operated booster pump has been known for example by U.S. Pat. No. 4,475,336. The known booster is designed so that the pump is driven throughout the operation of the booster to draw hydraulic oil from the reservoir and discharge the oil under pressure into the power chamber of the booster. This arrangement is disadvantageous in that the electrically operated pump is subjected always to a load corresponding to the load on the booster as long as the booster is in operation, so that substantial electric power is consumed and deterioration of oil is increased.

OBJECT OF THE INVENTION

It is therefore an object of the present invention to provide a hydraulic booster having an electrically operated pump, in which power consumption can be substantially decreased.

A further object of the present invention is to provide a hydraulic booster in which deterioration of oil can be reduced substantially.

Still further object of the present invention is to provide a hydraulic booster having an electrically operated pump, in which load on the pump can be decreased.

SUMMARY OF THE INVENTION

According to the present invention, the above and other objects can be accomplished by a hydraulic booster comprising booster casing means having an inside cavity, power piston means axially slidably received in the cavity of the booster casing means and being formed with an axial bore, input piston means axially slidably received in the axial bore of the power piston means, said input piston means having one end extending through the power piston means and the booster casing means to project outwardly, manually operated means provided for cooperation with said one end of the input piston means to cause an axial inward movement of the input piston means, said power piston means dividing the cavity in the booster casing means into a power chamber located at an end adjacent to said one end of the input piston means and a reservoir chamber located at the other end, said power piston means having an axial extension extending from the end opposite to said power chamber, said extension being projected into a pressure chamber of master cylinder means, electrically operated plunger pump means having outlet port means connected with said power chamber and inlet port means, said reservoir chamber being communicated with accumulator means, first valve means provided between said input piston means and said power piston means for connecting said power chamber to said reservoir chamber in a release position of the input piston means and disconnecting said power chamber from said reservoir chamber when said input piston means is axially depressed with respect to said power piston means by a first predetermined distance, second valve means provided between said input piston means and said power piston means for connecting said inlet port means of the pump means with said reservoir when said input piston means is axially depressed with respect to said power piston means by a second predetermined distance which is greater than the first predetermined distance, whereby the inlet port means of the plunger pump means is disconnected from the reservoir chamber in the released position of the input piston means and, when the input piston means is depressed, the first valve means is at first closed to disconnect the power chamber from the reservoir chamber and thereafter the second valve means is opened to connect the inlet port means of the pump means with the reservoir chamber.

According to the features of the present invention, the inlet port means of the pump means is closed in the initial period of the operation of the booster. Further, when the input piston means is held in a depressed position, the inlet port means of the pump means is also closed as soon as the power piston means is axially displaced under the pressure in the power chamber. It is therefore possible to eliminate or substantially decrease the load on the pump means. Since the reservoir chamber is compressed by an axial displacement of the power piston means, the oil is supplied under a positive pressure from the reservoir chamber to the inlet port means of the pump means so that it is possible to prevent cavitation in the pump means. The electrically operated pump means may be operated through a switch which is actuated by the manually operated means such as a foot pedal. Alternatively, it may be operated through a pressure switch which is actuated by a pressure in the pressure chamber.

The above and other objects and features of the present invention will become apparent from the following descriptions of preferred embodiments taking reference to the accompanying drawings.

BRIEF DESCRIPTIONS OF THE DRAWINGS

DESCRIPTION OF THE PREFERRED EMBODIMENTS

Figure 1:
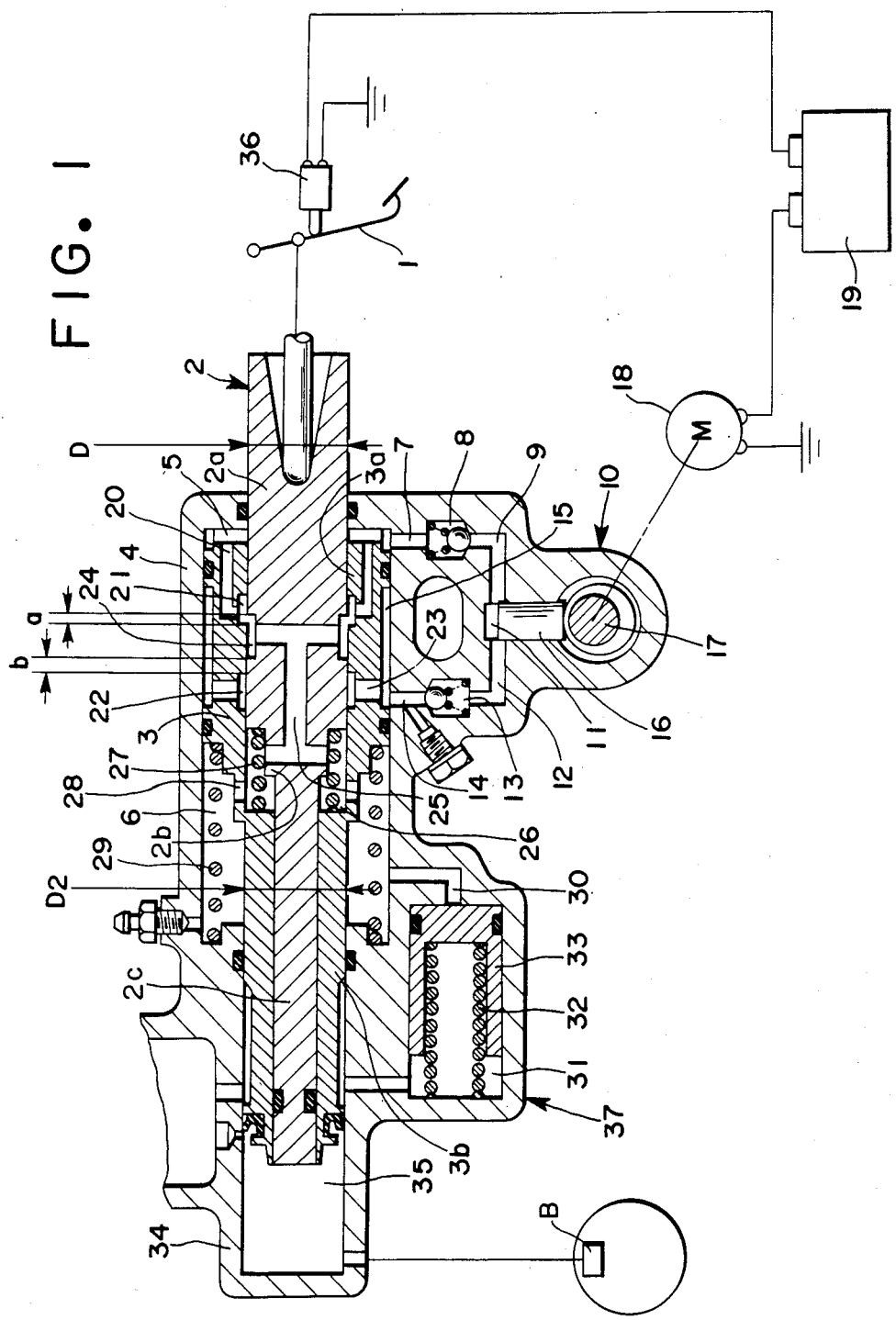
FIG. 1 is a longitudinal sectional view of a hydraulic brake booster in accordance with one embodiment of the present invention.

Referring to the drawings, particularly to FIG. 1, there is shown hydraulic booster assembly including an input piston 2 which is adapted to be operated by a brake pedal 1. The input piston 2 iucludes a large diameter portion 2a having a diameter $D_1$, a medium diameter central portion 2b and a small diameter portion 2c. The input piston 2 is axially slidably received in an axial bore of a power piston 3 which is in turn slidably received in a booster casing 4. The power piston 3 iucludes a large diameter portion 3a and a small diameter portion 3b having a diameter $D_2$. The large diameter portion 3a of the power piston 3 divides the inside cavity of the booster casing 4 into a power chamber 5 and a reservoir chamber 6. The power chamber 5 is located at an end adjacent to the brake pedal 1 and connected through a passage 7, a check valve 8 and a passage 9 to a plunger chamber 11 of a plunger pump 10. The check valve 8 is arranged so that it opens only toward the power chamber 5 so that the passages 7 and 9 constitutes an outlet line for the plunger pump 10.

The large diameter portion 3a is formed at the outer surface with an annular groove 15 which is connected through passages 12 and 14 and a check valve 13 to the plunger chamber 11. The check valve 13 opens only toward the plunger chamber 11 so that the passages 12 and 14 defines an inlet line for the plunger pump 10. The plunger pump 10 is constituted by a plunger 16 slidable in the plunger chamber 11 and a cam 17 for applying reciprocating movements to the plunger 16. The cam 17 is connected with an output shaft of an electric motor 18 to be driven thereby. The motor 18 is supplied with electric power from a power source such as a battery 19.

The power piston 3 is formed at the inner surface with a first circumferential groove 21 which is connected through a passage 20 with the power chamber 5. The power piston 3 is also formed with a second circumferential groove 22 which is axially spaced from the first groove 21 in the inner peripheral surface of the power piston 3. The second groove 22 is connected with the groove 15 formed in the outer surface of the power piston 3 through a passage 23 formed in the power piston 3.

The input piston 2 is formed at the outer surface of the large diameter portion 2a with a circumferential groove 24 which cooperates with the first groove 21 in the power piston 3 to provide a first valve. It will be understood that the connection between the groove 24 in the input piston 2 and the first groove 21 in the power piston 3 is controlled by an axial position of the input piston 2. The groove 24 in the input piston 2 further cooperates with the second groove 22 in the power piston 3 to define a second valve. The connection between the grooves 22 and 24 is also controlled by an axial position of the input piston 2. The groove 24 in the input piston 2 is opened through a passage 25 to the outer periphery of the medium diameter portion 2b so that the groove 24 is connected with a chamber 26 which is defined in the power piston 3 around the small diameter portion 2c of the input piston 2. In the chamber 26, there is a compression spring 27 which functions between the pistons 2 and 3 to force the piston 2 toward right and the piston 3 toward left as seen in the plane of FIG. 1.

The power piston 3 is formed with a passage 28 which connects the chamber 26 with the reservoir chamber 6. In the reservoir chamber 6, there is a spring 29 which functions to force the power piston 3 toward right. In the booster casing 4, there is provided an accumulator 37 comprising a cylindrical chamber 31 and a piston 33 which is slidable in the chamber 31 and biased by a spring 32 toward right. The reservoir chamber 6 is connected through a passage 30 with the right hand end of the cylindrical chamber 31 in the accumulator 37. The booster casing 4 has a master cylinder casing 34 integrally formed therewith at an end opposite to the power chamber 5. In the master cylinder casing 34, there is defined a pressure chamber 35 to which the small diameter portion 3b of the power piston 3 is exposed. The pressure chamber 35 is connected with a brake actuator B through a brake hose.

For the control of the operation of the motor 18, there is provided a switch 36 which is arranged so that it is closed when the brake pedal 1 is depressed.

In operation, when the brake pedal 1 is depressed, the input piston 2 is axially displaced toward left by the brake pedal 1. When the input piston 2 is displaced by a distance a, the groove 24 in the input piston 2 is disconnected from the groove 21 in the power piston 3 to close the first valve. At this instance, the switch 36 is closed so that the motor 18 starts to operate. Thus the cam 17 is rotated to apply reciprocating movements to the plunger 16 of the pump 10. Since the first and second valves are closed at this instance, however, there is no output flow from the plunger pump 10. Due to the axial displacement of the input piston 2, the oil in the chamber 26 is displaced through the reservoir chamber 6 and the passage 30 into the chamber 31 of the accumulator 37.

As the input piston 2 moves further to left beyond a distance b, the groove 24 in the input piston 2 is opened to the groove 22 in the power piston 3 to open the second valve. Thus, the chamber 26 is communicated with the inlet passage 14 for the plunger pump 10. The oil accumulated in the accumulator 37 is then drawn through the chamber 26 and the passages 14 and 12 to the plunger chamber 11 of the pump 10. The output of the pump 10 is then directed through the passages 9 and 7 to the power chamber 5 to force the power piston 3 toward left against the influence of the spring 29. The leftward movement of the power piston 3 displaces the oil in the reservoir chamber 6 through the chamber 26 to the plunger pump 10 so that a further output flow is supplied from the pump 10 to the power chamber 5. Thus, the power piston 3 is forced further left. The leftward movement of the power piston 3 compresses the oil in the pressure chamber 35 in the master cylinder 34 and the pressurized oil is supplied to the brake actuator B.

It will be noted in FIG. 1 that the input piston 2 extends through the power piston 3 so that the terminal end of the small diameter portion 2c is exposed to the pressure chamber 35. Thus, the operator can feel the pressure in the chamber 35 through the brake pedal 1. The power piston 3 is maintained at a position wherein the first and second valves are closed as long as the brake pedal 1 is held at a depressed position. At this position the plunger 16 of the pump 10 simply repeats the reciprocating movements without any output. Therefore, the load on the motor 18 is substantially eliminated. When the brake pedal 1 is released the input piston 2 is moved rightward so that the first valve is opened while the second valve is closed. Thus, the oil in the power chamber 5 is allowed to flow through the passage 25 and the chamber 26 to the reservoir chamber 6. In this instance, there is no output flow from the plunger pump 10 so that the motor 18 is operated without any substantial load.

It will be understood that in the structure described above, the plunger pump 10 is subjected to load only when the brake pedal 1 is depressed so that power cousumption is decreased. Further, it is possible to suppress noise. Since a positive pressure is applied to the inlet passage of the plunger pump 10, it is possible to prevent cavitation. In case where the diameter $D_1$ of the large diameter portion 2a of the input piston 2 is substantially the same as the diameter $D_2$ of the small diameter portion 3b of the power piston, the quantity of the oil introduced into the accumulator 37 is substantially the same as the displacement due to a relative axial movement between the pistons 2 and 3. Therefore, it is possible to make the accumulator 37 compact.

Figure 2:
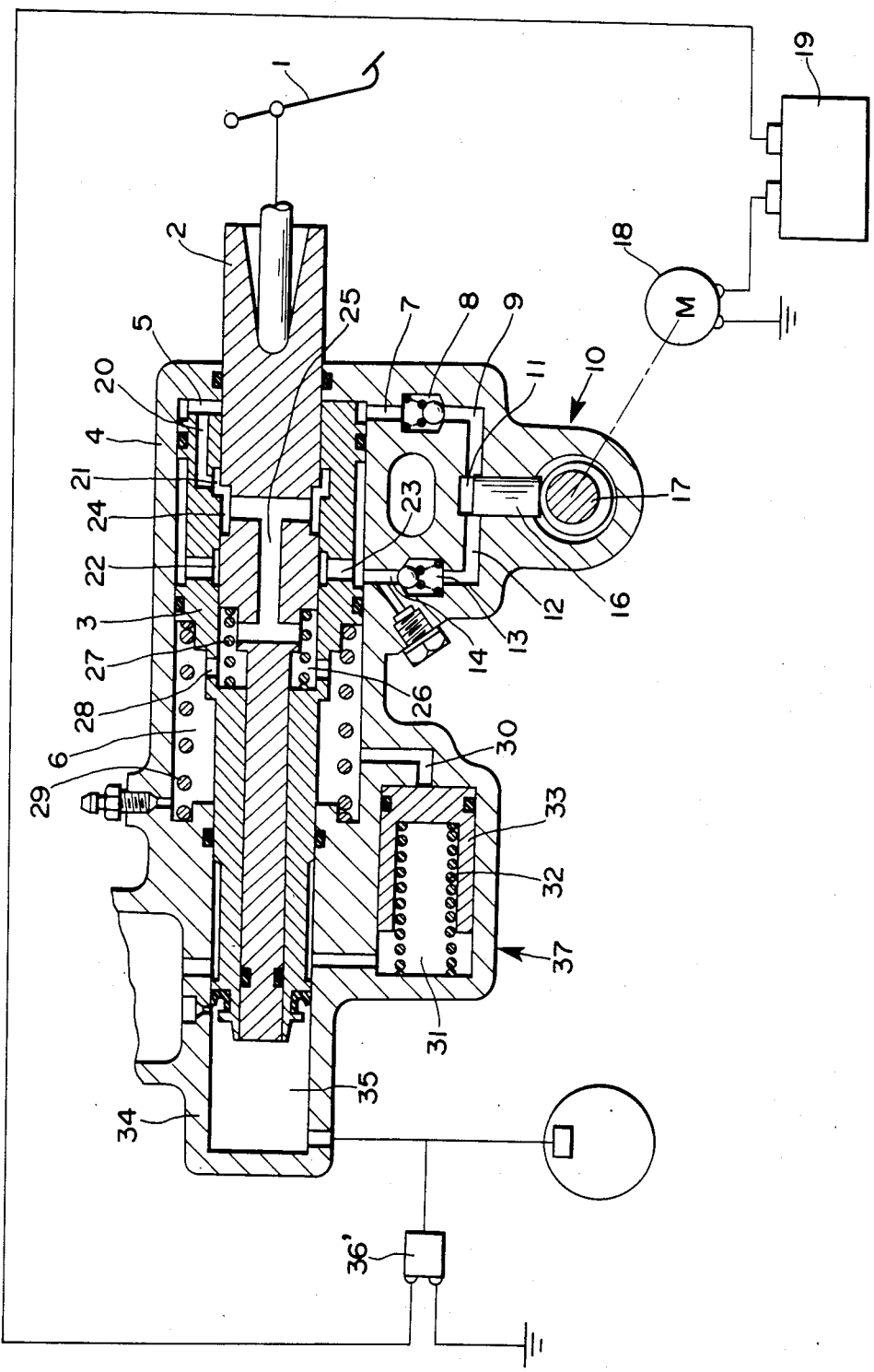
FIG. 2 is a longitudinal section of a hydraulic booster in accordance with another embodiment of the present invention.

Referring now to FIG. 2, there is shown another embodiment of the present invention which is substantially the same in structure as the embodiment shown in FIG. 1. In this embodiment, however, the pedal-actuated switch 36 is substituted by a pressure switch 36' which is closed under the pressure in the chamber 35 when the input piston 2 is actuated by the brake pedal 1.

Figure 3:
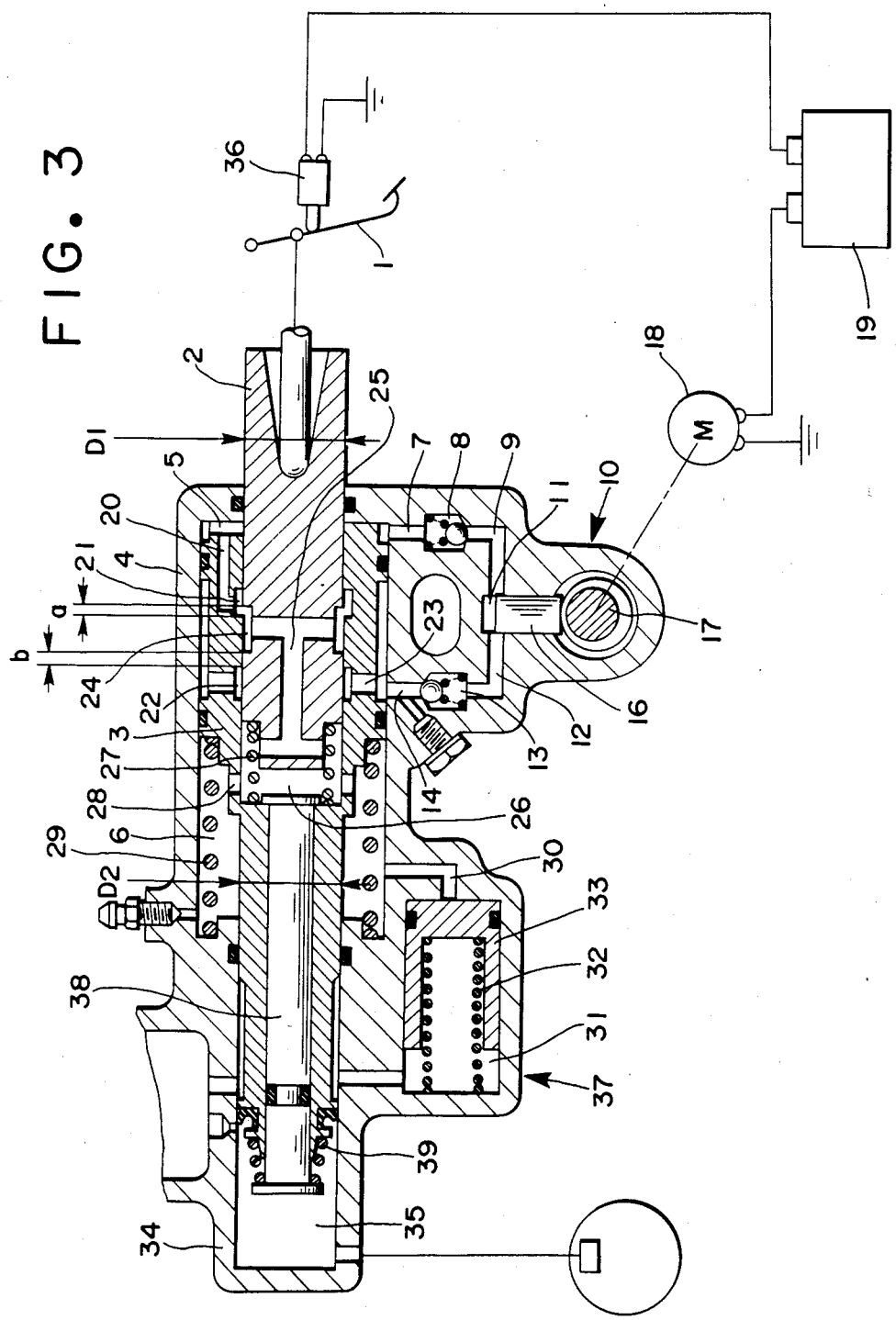
FIG. 3 is a longitudinal sectional view similar to FIGS. 1 and 2 but showing a further embodiment of the present invention, and, FIG. 4 is a longitudinal sectional view similar to FIG. 2 but showing an improvement of FIG. 2.

FIG. 3 shows a further embodiment of the present invention in which the input piston 2 is terminated at the chamber 26 and a further piston 38 is provided for axial slidable movement in the power piston 3. The piston 38 has one end exposed to the chamber 26 and the other end exposed to the pressure chamber 35 so that the pressure in the chamber 35 is applied to the piston 38. The piston 38 is provided at the end in the chamher 26 with a flange so that its leftward movement is limited by the flange being abutted to the inner shoulder of the power piston. A spring 39 is provided in the pressure chamber 35 to force the piston 38 toward left.

Figure 4:
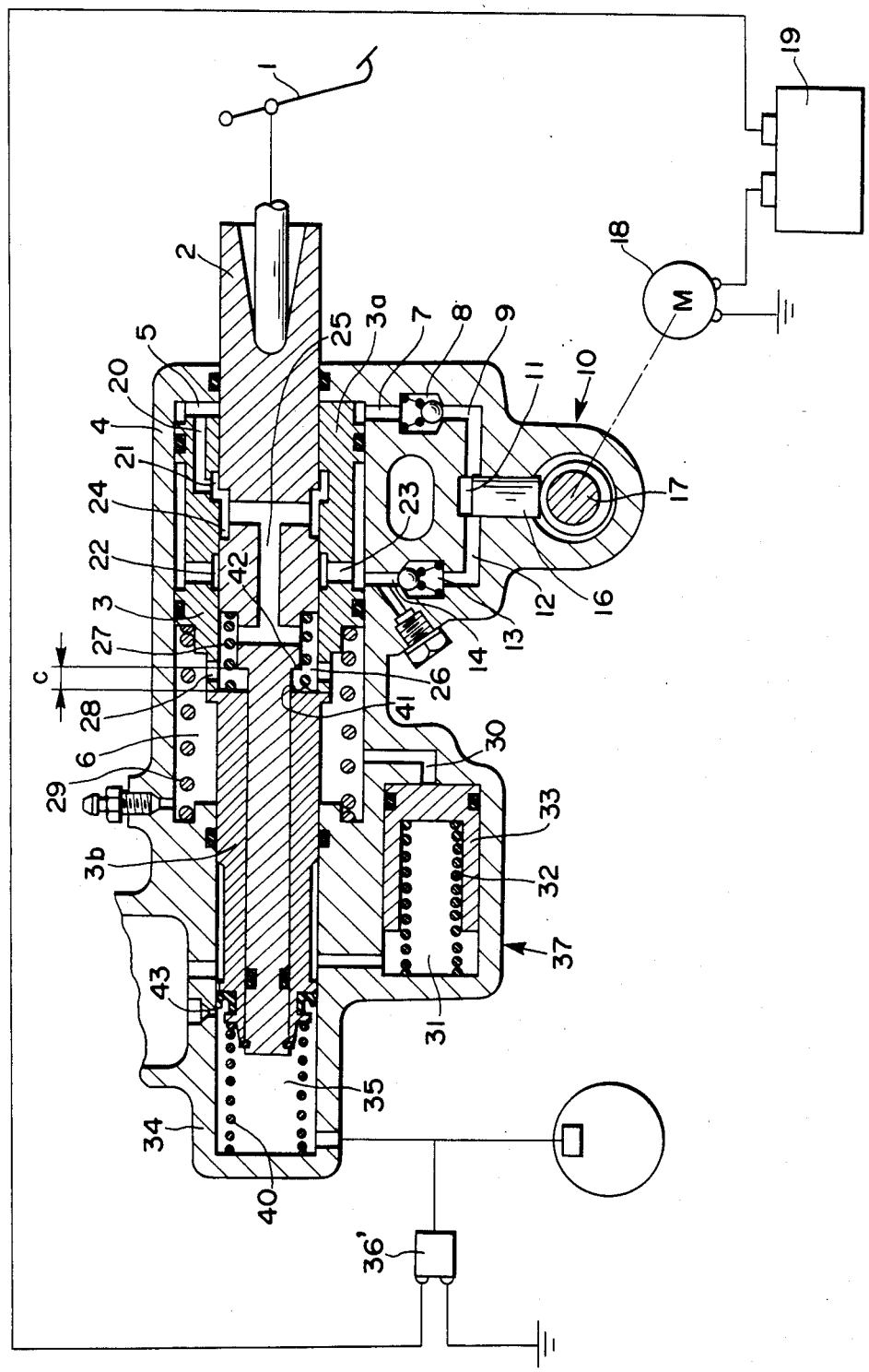

An embodiment of FIG. 4 is effective in easily increasing the pressure in the pressure chamber 35. In this instance, the small diameter portion 3b of the power piston 3 is separated from the large diameter portion 3a thereof and urged toward the large diameter portion 3a of the power piston 3 by a return spring 40. The end face 41 of the small diameter portion 3b of the power piston 3 is away from a shoulder 42 of the input piston 2 by a distance C which is slightly larger than the distance b in FIG. 1. When the input piston 2 is depressed beyond the distance C the shoulder 42 of the input piston 2 moves the small diameter portion 3b of the power piston 3 leftward so that a compensation port 43 is closed and a communication of the pressure chamber 35 and the reservoir is interrupted. The leftward movement of the small diameter portion 3b of the power piston 3 causes to increase the pressure in the chamber 35 to a level which can be detected by the pressure switch 36' and close an electrical circuit to operate the motor 18. In this case, it is noted that the close of the compensation port 43 is made independent on the strongest spring 29 so that light depression on the pedal 1 is possible for a brake operation.

The invention has thus been shown and described with reference to specific embodiments, however, it should be noted that the invention is in no way limited to the details of the illustrated structures but changes and modifications may be made without departing from the scope of the appended claims.

What is claimed is:

1. A hydraulic booster operatively connected to a brake master cylinder, said booster comprising:
 a booster casing defining an internal cavity;
 a power piston axially slidably received in said cavity, said power piston having first and second axially opposed ends and an axial bore, said power piston dividing said cavity into a power chamber proximate said first end and a reservoir chamber proximate said second end;
 an input piston axially slidably received in said axial bore, one end of said input piston extending through the first end of said power piston and through said booster casing to project outwardly, said input piston being normally in a released position;
 manually operable means operatively connected with the one end of said input piston for effecting selective axial inward movement of said input piston from said released position;
 an electrically operated plunger pump having an outlet port in fluid communication with said power chamber and an inlet port;
 an accumulator in fluid communication with said reservoir chamber;
 first valve means provided between said input piston and said power piston for permitting fluid communication between said power chamber and said reservoir chamber and preventing fluid communication with said inlet port when said input piston is in said released position and for preventing fluid communication between said power chamber and said reservoir chamber when said input piston is axially displaced relative to said power piston a first predetermined distance;
 means for actuating said pump upon axial displacement of said input piston; and
 second valve means provided between said input piston and said power piston for permitting fluid communication between said inlet port and said reservoir chamber when said input piston is axially displaced relative to said power piston a second predetermined distance greater than said first predetermined distance to thereby pump fluid under pressure into said power chamber, and for discontinuing fluid communication between said inlet port and said reservoir chamber when pressure in said power chamber axially moves said power piston relative to said input piston to thereby remove the load on said pump while said input piston is held axially displaced said second predetermined distance.

2. The hydraulic booster of claim 1 wherein said actuating means comprises electric switch means responsive to axial movement of said input piston.

3. The hydraulic booster of claim 1 wherein said actuating means comprises electric switch means responsive to actuation of said manual operable means.

4. The hydraulic booster of claim 1 wherein said actuating means comprises pressure switch means responsive to hydraulic pressure in a pressure chamber of said master cylinder for actuating said pump when said hydraulic pressure exceeds a predetermined level.

5. The hydraulic booster of claim 1 also including an extension member axially extending from the second end of said power piston, said extension member having an end remote from said power piston projecting into a pressure chamber of said master cylinder and having a axial bore coaxial with the bore of said power piston.

6. The hydraulic booster of claim 5 wherein said input piston includes a projection member axially extending from the other end of said input piston and into the bore of said extension member, the end of said projection member remote from said input piston being exposed to the hydraulic pressure in said pressure chamber.

7. The hydraulic booster of claim 5 also including a third piston coaxial with said input piston and slidably disposed in the bore of said extension member, one end of said third piston being exposed to pressure in said pressure chamber and the other end of said third piston being disposed axially adjacent the other end of said input piston for abutting contact when said input piston is axially moved from said release position.

8. The hydraulic booster of claim 7 further including means for biasing said third piston toward said pressure chamber and stopper means for limiting axial movement of said third piston toward said pressure chamber.

* * * * *